United States Patent [19]
Taggett et al.

[11] Patent Number: 5,617,636
[45] Date of Patent: Apr. 8, 1997

[54] TRAIL BLAZING STUMPCUTTER

[76] Inventors: Peter T. Taggett, P.O. Box 15, Mt Holly, Vt. 05758; Edward J. Grossi, 35 Warner Ave., Proctor, Vt. 05765

[21] Appl. No.: 497,021

[22] Filed: Jun. 30, 1995

[51] Int. Cl.$^6$ .................................................. A01D 34/68
[52] U.S. Cl. ................................. 30/276; 30/347; 56/12.7
[58] Field of Search ................................. 30/276, DIG. 5, 30/347; 56/12.7

[56] References Cited

U.S. PATENT DOCUMENTS

| | | | |
|---|---|---|---|
| D. 370,489 | 6/1996 | Taggett et al. | D15/17 |
| 2,028,784 | 1/1936 | Jennett | 30/276 |
| 4,031,792 | 6/1977 | Borzym et al. | 83/601 |
| 4,162,575 | 7/1979 | Ballas | 30/347 |
| 4,571,831 | 2/1986 | White, III | 30/347 X |
| 4,790,071 | 12/1988 | Helmig et al. | 56/12.7 X |
| 4,928,457 | 5/1990 | Laperle | 30/276 X |
| 4,996,828 | 5/1991 | Jetzinger | 52/12.7 |
| 5,048,278 | 9/1991 | Jones et al. | 30/276 X |
| 5,430,943 | 7/1995 | Lee | 30/276 X |

*Primary Examiner*—Rinaldi I. Rada
*Assistant Examiner*—Elizabeth Stanley

[57] ABSTRACT

The instant device consists of a circular top plate made of ALMAG 35 aluminum and magnesium alloy material with a centerhole and three through holes near its rim and 120° apart from one another into which three cylindrically shaped pins have been tightly pressed. Three identical beveled metallic blades with rounded holes in them are swivably received one each by the pins. A circular bottom plate also made of such ALMAG 35 material has a centerhole and three broken holes for receipt of the bottoms of the pins when the device is fully assembled plate to plate and held with a bolt and nut from below the bottom plate via the centerholes and adapter means to the rotatory head of a motorized brush cutting unit. A centrally located elevation upward in the bottom plate co-extensive with two convex ridges on its top surface fits into a centrally positioned cylindrical well in the bottom side of the top plate co-extensive with two concave depressions in the wall of the well as the depressions concomitantly receive the ridges thereby sandwiching the blades and pins during completed assembly of the invention to the rotatory head. A left handed nut serves to secure the fully assembled invention intact and the nut is self tightening during counterclockwise head rotation.

4 Claims, 5 Drawing Sheets

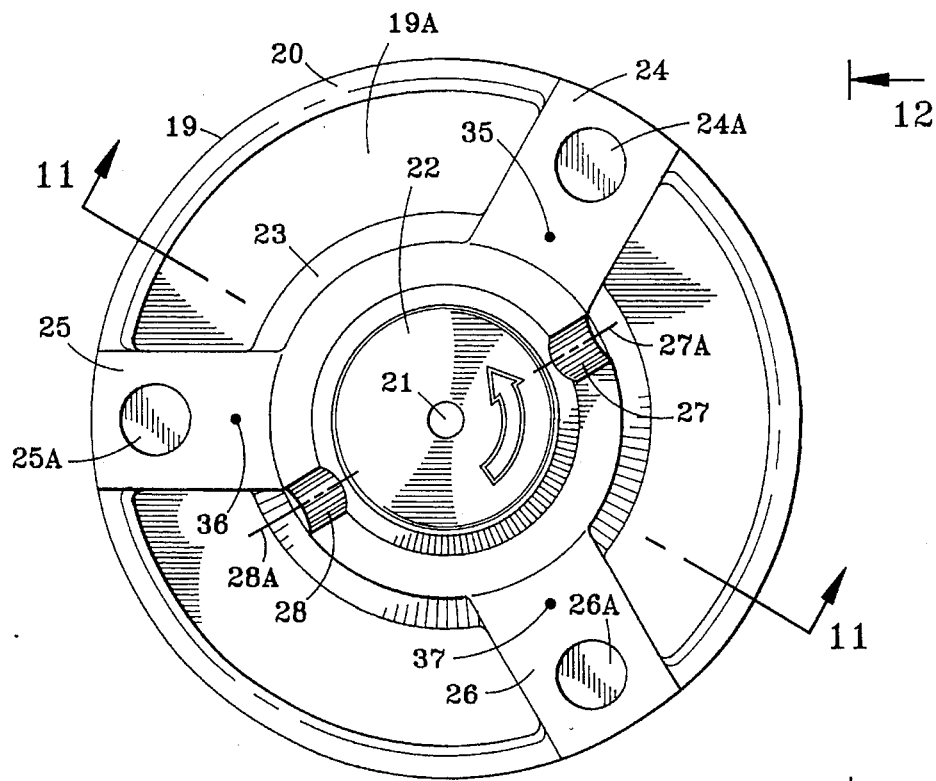
FIG. 10
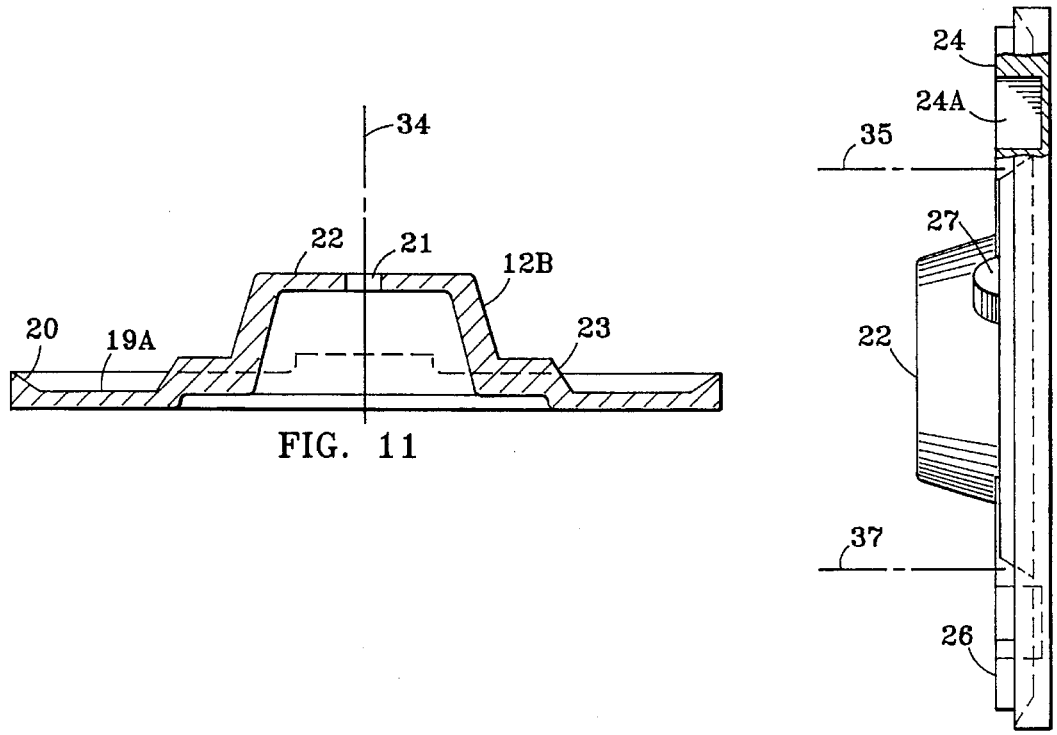
FIG. 11
FIG. 12

TRAIL BLAZING STUMPCUTTER

CROSS REFERENCES TO PRIOR APPLICATIONS

There are no prior or parent applications as respects the instant device.

FEDERALLY SPONSORED RESEARCH AND DEVELOPMENT

There is no federally sponsored research and development as respects the instant device.

BACKGROUND OF THE INVENTION

1. Field of the Invention

The instant device is one of those types of devices that serves to cut vegetation.

2. Possible Prior Art

The following references depict devices that somewhat remotely resemble but do not anticipate the instant device:

| Inventor | Invention | Patent #: | Date |
| --- | --- | --- | --- |
| Hull, et al | Brush and Tree Cutter Blade | 5,063,731 | 11/12/91 |
| Feldman, et al. | Trimming Head for Vegetation | 4,270,271 | 6/2/81 |
| Barbula | Cutting Attachment for a Weed Trimmer | 301,110 | 5/16/89 |
| Helmig et al | Line Trimmer with Replaceable Cutting Blade Assembly | 4,790,071 | 12/13/88 |
| Rebhun | Weed Cutter Construction | 4,107,841 | 8/22/78 |
| Lee | Cutting Attachment for Trimmers | 4,856,194 | 8/15/89 |
| Goserud | Lawn Mower Cutters | 3,715,874 | 2/13/73 |

A SUMMARY OF THE INVENTION

1. A BRIEF DESCRIPTION OF THE INVENTION

The instant invention is a device that, to begin with, is made up of three identical beveled metallic blade components within each of which a hole is found near the end opposite the beveled end, three identical cylindrical metallic pins that fit through each of the blade holes respectively and that are each in turn press-fitted tightly one each into each one of three top plate through holes in a top plate component so-called where each plate hole is separated by angles of 120° from the two other plate holes adjacent to it. The top plate is circular in shape and is made of ALMAG 35, an aluminum and magnesium alloy. This plate has a flat top side and a centerhole extending from the top side through to a bottom side. Its bottom side is characterized by the presence of a slightly elevated circular rim circumscribing its outer perimeter. Moreover, its bottom side is characterized by a cylindrically shaped downwardly directed well therefrom co-extensive with a conically inclined recession downward which is in turn co-extensive with the flooring of the bottom side, the greatest diameter of which downwardly directed well is significantly less than that of the plate. The vertical axis of symmetry of the centerhole, the downwardly directed well and the plate itself is one and the same. Extending from and co-extensive with the outer walls of the recession and the well are each of three solid rectangularly shaped abutments that are likewise co-extensive. with the flooring of the bottom side the recession and the above-mentioned circular rim. Each abutment, the vertical axes of symmetry of each of which are 120° removed from the vertical axes of symmetry of the two adjacent abutments, contains one of the abovementioned top plate through holes into which, one each respectively of the cylindrical pins have been press-fitted. A first rounded concave depression in the wall of the well is found just adjacent the left side of one abutment and a second rounded concave depression in the wall of the well is found just adjacent the right side of an adjacent abutment such that the depressions are 180° removed from one another. At the base of the inner wall of the well there is also flooring of the bottom side within the center of which there is the centerhole. An arrow pointing in a clockwise direction is etched into this portion of the bottom side flooring. Finally, there is also a bottom plate. This bottom plate is made of ALMAG 35 alloy material as well. It is likewise circular in shape with an outer diameter equal to that of the top plate. The bottom side of the bottom plate has a flat external surface that is slightly recessed closer to the center of the bottom plate. Closer still to the center of the bottom plate there is to be found a hollow cylindrical elevation extending from bottom to top within the center of which there is a center hole extending from the floor of the hollow cylindrical elevation through to the top side of the bottom plate and about and co-extensive with the lower portion of which hollow cylindrical elevation there is a conically shaped elevation surfacewise co-extensive with the base surface of the top side. The top side of the bottom plate is characterized by the presence of a slightly elevated circular rim that circumscribes its outer perimeter. On the top outer surface of the cylindrical elevation in the bottom plate there is etched an arrow pointed in a counterclockwise direction. The top outer surface of the previously described conically shaped elevation of the bottom plate which is co-extensive with the outer wall of the bottom plate hollow cylindrical elevation is also co-extensive with each of three solid rectangularly shaped abutments jutting therefrom and reaching to the outer rim of the top side of the bottom plate. The long vertical central axis of symmetry of each abutment is 120° removed from the long vertical central axes of the two adjacent abutments. In each of these abutments near the outer rim of the top plate is a closed hole just large enough to receive the bottom portions of each one of the abovementioned pins each holding a beveled blade when the top plate and bottom plate are assembled to one another. Extending from and co-extensive with the outer surface of the hollow cylindrically shaped elevation on the top side of the bottom plate and co-extensive with the top outer surface of the concave shaped elevation of the bottom plate are each of two rounded convex ridges 180° removed from one another that each fit respectively snug into one of the abovementioned concave depressions in the bottom side of the top plate when the two plates are assembled together.

When the two plates with pins and blades are assembled together, they are then fitted to the rotatory head of a motorized brush cutter stem, top side of top plate first and affixed thereto by way of an appropriate nut and bolt combination depending on the type of head to be fitted to. The instant invention so affixed to a rotatory head is then ready to serve as a heavy duty vegetation cutting tool.

2. OBJECTS OF THE INVENTION

There is a virtually never ending need for the expeditious commercial forging of ski trails, snowmobile trails, cross-country trails, horse trails and commercial clearing of power line rights-of-way and golf courses throughout the country. Such undertakings often prove to be laborious, time-consuming and relatively expensive. The instant invention however serves to greatly minimize such labor, time and cost. To begin with, one of the major problems with respect to the utilization of any currently used brushcutting device is the one wherein invariably it proves virtually impossible to cut level to ground. Consequently, after cutting, there are nevertheless vestiges of stumps still left standing that can prove to be problematic with respect to vehicular tires or to ski units after cutting. The instant invention unlike all of the prior art however permits cutting right level to ground rather than only to a level of two inches or so above ground such that therefore such problems associated with stump vestiges are totally eliminated. Additionally, the plates of the instant invention being made of ALMAG 35, an alloy of aluminum and magnesium make for a much lighter cutting tool to be fitted to the head of a brush cutting stem unit. Ease of use by a workman is thus greatly facilitated. The instant invention consisting of two plates, one with three press fitted pins and three freely rotatable beveled blades is extremely easy to assemble. This feature together with its relatively light weight as well as its facility for absorbing the shock of cutting and thereby greatly reducing any flow of cutting shock up the stem of a brush cutter renders the instant invention inherently much more user friendly than any of the various currently in vogue cutting tools utilized for such clearing. Also, the instant invention is amenable to being fitted to a counterclockwise turning rotatory head or to one that turns clockwise simply by fitting its three blade components to its pin components during assembly such that blade beveled ends face in the direction of rotation of the head. If a user cuts right to left when utilizing a cutter with a counterclockwise turning head, he or she will avoid kickback when hitting a tree, once again due to the swivel capability of each of the invention's blade components held by its press fitted pins. This feature of swivelability about pins permits a simple collapsing inward of blades upon impact with rocks thereby alleviating problems associated with rock impact shock. Also, the plate components are rust proof and shatterproof under all conditions of cutting thereby rendering the instant invention eminently more durable and inherently much safer than any of the cutting tools currently in use for such heavy brush and stump cutting purposes in areas where lots of rocks are located. Finally, unlike any other cutting tool available for clearing heavy, thick brush and small tree stumps during the course of a significant commercial undertaking, deformation with use and wear to the extent it might ever occur at all occurs only uniformly throughout the whole tool by virtue of the manner in which the two plates fit together when assembled. Also, blades of varying length and hardness can be utilized in conjunction with the plates and pins. Short, relatively thick blades are particularly useful to cut small tree stumps flush to the level of ground. Longer not quite so thick blades serve to cut heavy clumps of grass and weeks flush to the level of ground.

Respectfully submitted, the instant invention in view of its above-described user and rock friendly features that enable heavy vegetation cutting and clearing to be undertaken on the average 27 percent faster on the basis of studies conducted by your inventor comparing its capabilities to other cutting heads currently in use render it indeed not only new, useful and unique but indeed virtually revolutionary in the art of brush cutting tools.

A DESCRIPTION OF THE DRAWINGS

FIG. 10 is a top view of the bottom plate.

FIG. 11 is an end cross-sectional view of the bottom one of the invention's two plate components.

FIG. 12 is an end view of the bottom one of the invention's two plate components.

A DESCRIPTION OF THE PREFERRED EMBODIMENTS

Figure 1:
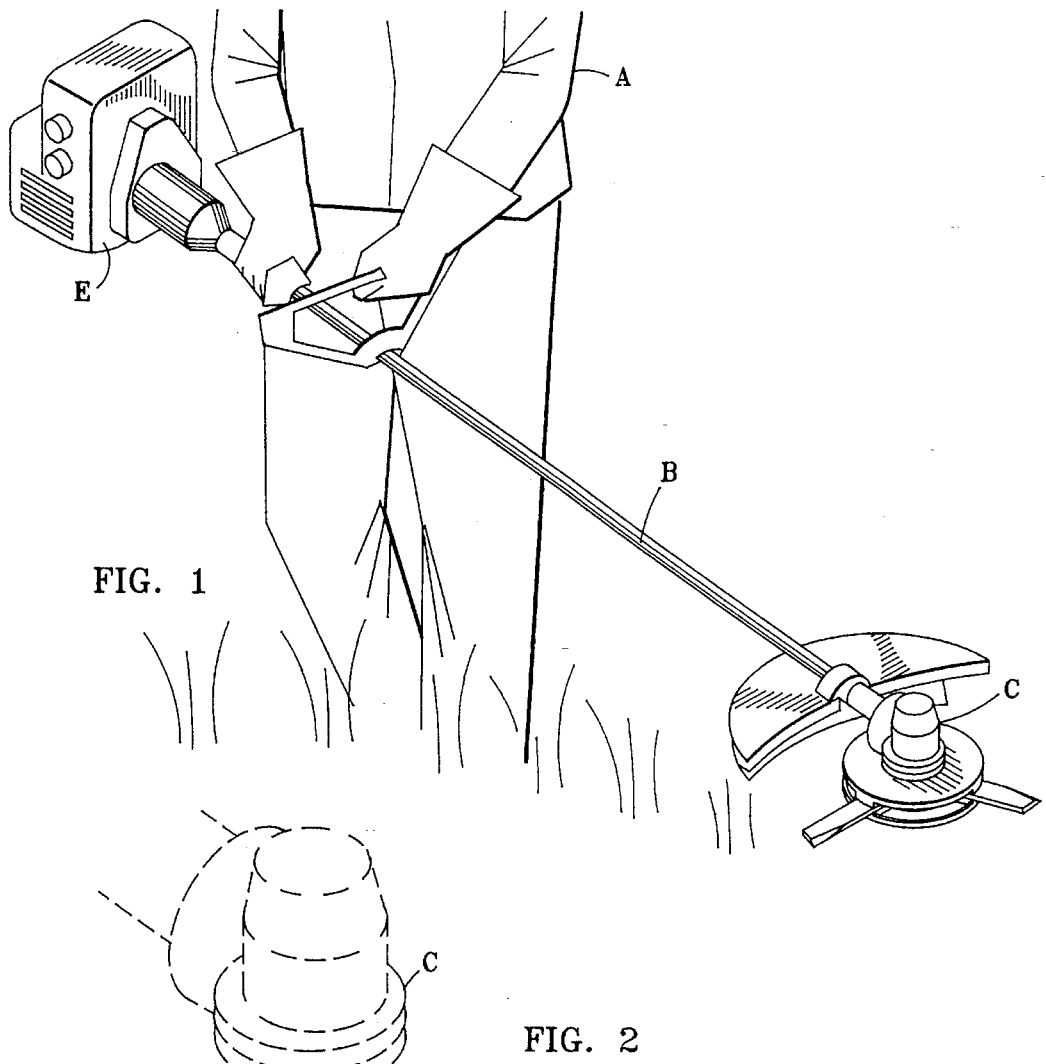
FIG. 1 shows utilization of the instant invention mounted to a brush cutting head on a stem.
Figure 2:
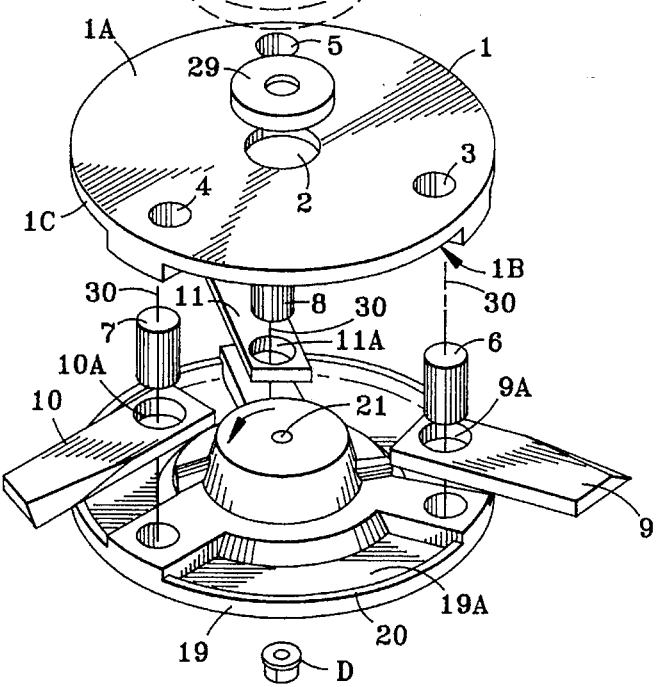
FIG. 2 is an exploded perspective view of the instant invention in apposition to the head of a brush cutting stem.

FIG. 1 illustrates utilization of the invention by a user A holding a heavy duty brushcutter stem B to which a rotatory head C is affixed and in turn to which the fully assembled invention is being held. FIG. 2 shows the various components of the invention in exploded view in close apposition to a brush cutting head C. Securing means, namely a holding nut D seen in FIG. 2 that is part and parcel of a garden variety motorized brushcutter stem and head unit serves to hold the fully assembled invention to the threaded extension of most cutting heads C on most such units. Some such unites are equipped with so-called female heads C as contrasted with the male cutting head C shown in FIG. 2. Such female head C units have internal threading that receive threaded bolts to which a nut D can in turn be threaded in order to hold the fully assembled invention fast to a head C. As head C rotates under the power of the motor E of such a unit, the fully assembled invention affixed thereto also rotates. Most heads C rotate counterclockwise thereby promoting counterclockwise rotation of the fully assembled invention affixed thereto. Nut D is typically a left-handed nut that tightens with such counterclockwise rotation. In the case of the occasional head C on a given unit that rotates clockwise, a right handed nut D promotes self tightening during rotation. In view of the foregoing, it can readily be appreciated that the fully assembled invention, in view of its bottom plate centerhole 21, top plate centerhole 2 and adapter 29 serving to receive extensions of male heads C or a threaded bolt fit with the internal threading of a female head C either of which can be threadably received by a holding nut D, is readily amenable to being utilized together with any form of motorized heavy duty stem and head unit.

Figure 3:
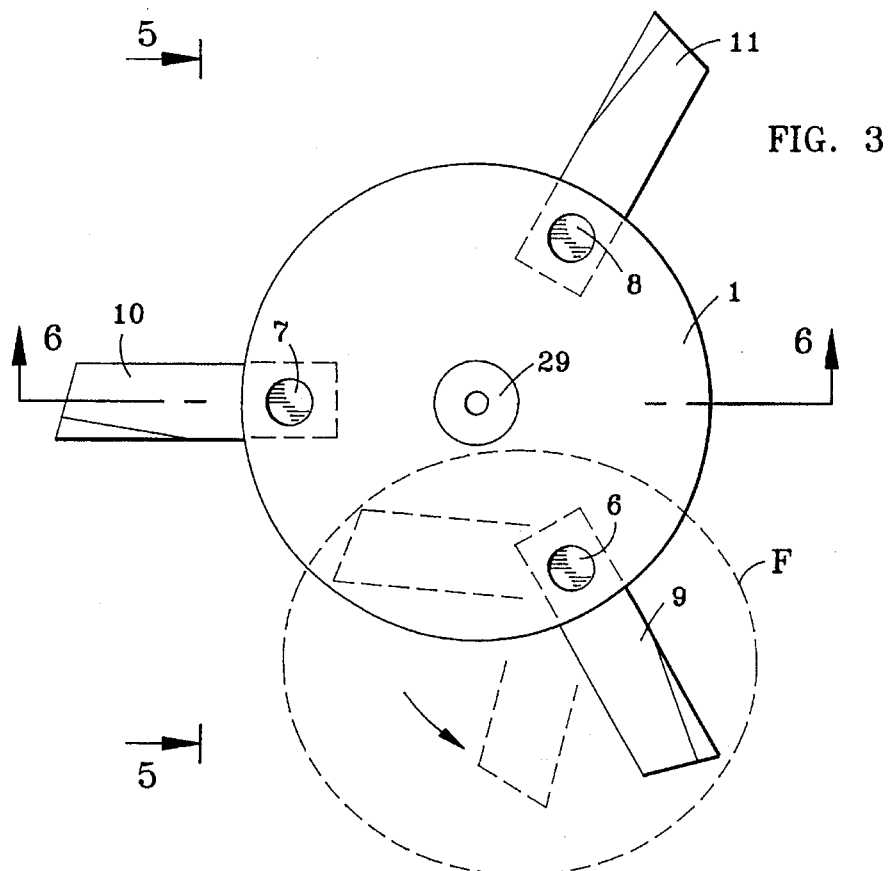
FIG. 3 is a top view of the top one of the invention's two plate components showing as well the loci of its three beveled blade components.
Figure 4:
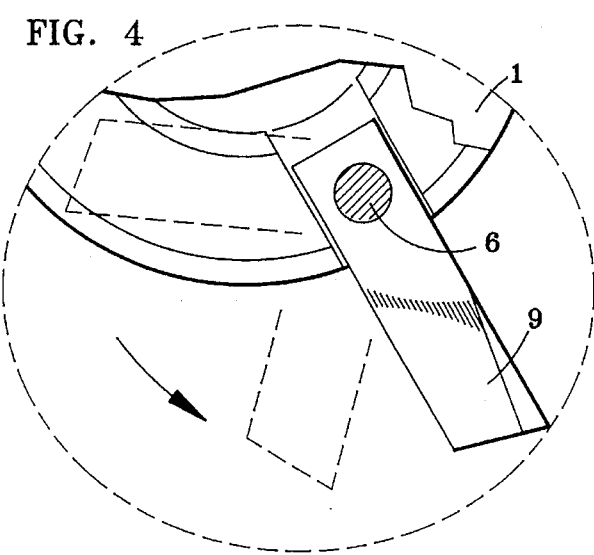
FIG. 4 is cutaway view of a portion of what is seen in FIG. 3 to show in more detail one of the invention's three beveled blade components affixed to one of its three press-fitted components.

With reference once again to FIG. 2, the flat top side 1A of circular shaped top plate 1 made of ALMAG 35 alloy material abuts the base of a head C. Within plate 1, there are three identical through holes: hole 3, hole 4 and hole 5. Metallic cylindrical pins 6, 7 and 8 are press-fitted firmly and permanently into each of these holes 3, 4 and 5 respectively. Swivably affixed to pins 6, 7 and 8 respectively via through holes 9A, 10A and 11A are beveled metallic blades 9, 10 and 11. Such affixation is appreciated with reference to FIGS. 3 and 4. As can be seen from those latter two figures, blades 9, 10 and 11 are able to swivel without restriction about pins 6, 7 and 8.

Figure 7:
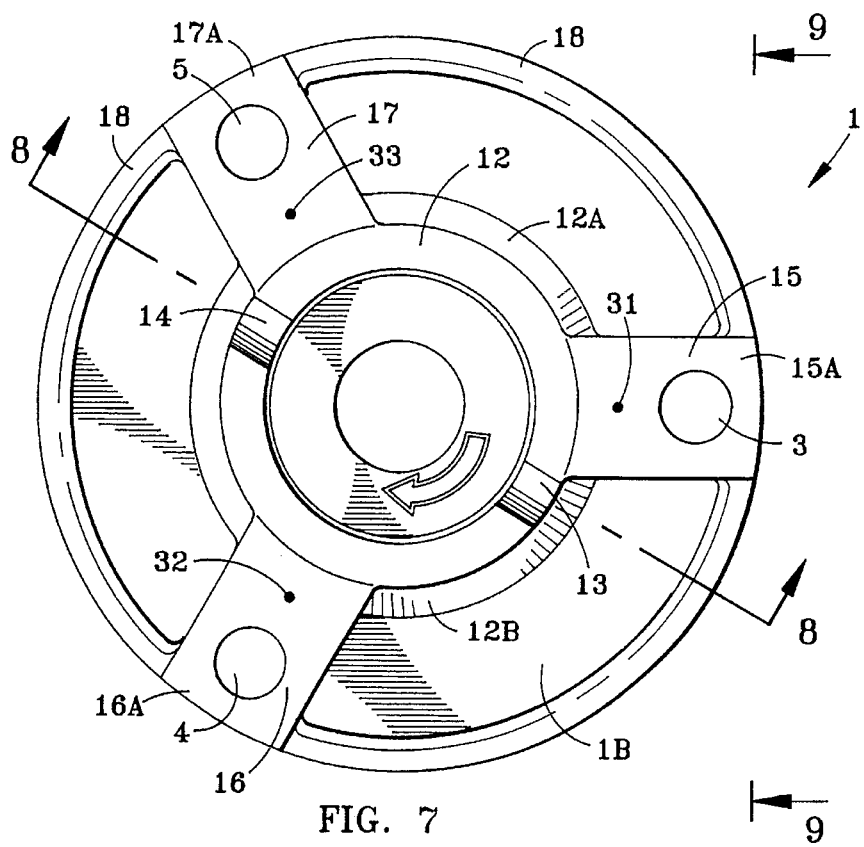
FIG. 7 is a bottom view of the top plate.
Figure 8:
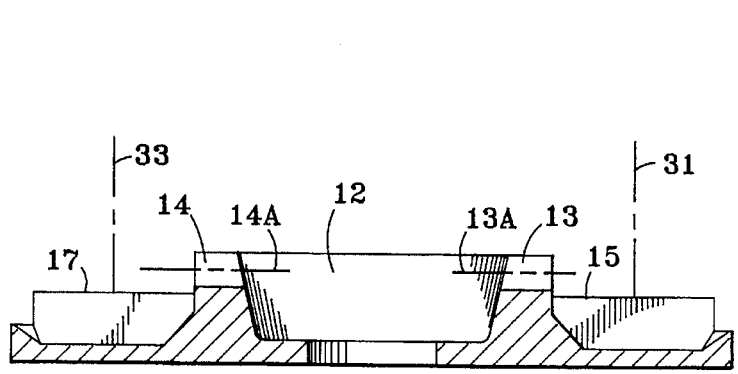
FIG. 8 is an end cross-sectional view of the top one of the invention's two plate components.
Figure 9:
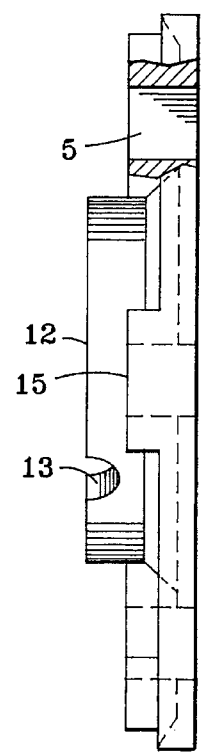
FIG. 9 is an end view of the top one of the invention's two plate components.
Figure 13:
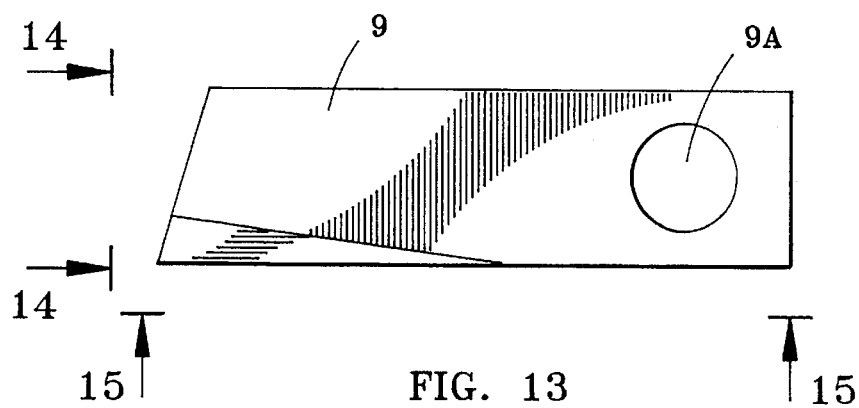
FIG. 13 is a top view of one of the invention's three identical blade components.
Figure 14:
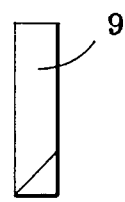
FIG. 14 is a frontal view of one of the invention's three identical blade components.
Figure 15:
FIG. 15 is a lateral view of one of the invention's three identical blade components.

The bottom side 1B of top plate 1 is seen with resort to FIG. 7. This bottom side 1B is characterized by the presence of a slightly elevated circular rim 18 about the external perimeter of bottom side 1B. It is also characterized by a centralized cylindrical well 12 co-extensive downward from a solid conically inclined recession 12A extending downward from the surface of the bottom side 1B. The long central axis of symmetry 30 seen in FIG. 7 of center hole 2, well 12, recession 12A and top plate 1 itself is one and the same. Co-extensive with the outer wall surface 12B of recession 12A are each of three solid rectangularly shaped abutments, 15, 16 and 17 that are also co-extensive with the surface of bottom side 1B as well as with circular rim 18. Through holes 3, 4 and 5 are located near the outer ends 15A, 16A, 17A of abutments 15, 16 and 17, and all three through holes are equidistant from the lateral surface 1C about the outermost brim of top plate 1. The respective vertical axes of symmetry 31, 32 and 33 of each abutment are each separated 120° from the vertical axes of symmetry 31 or 32 or 33 of the abutments adjacent thereto. To the left and approximate to the center left corner of abutment 15, there is found concave depression 13 and to the right of and proximate to the right corner of abutment 17, there is found concave depression 14 such that both depressions are separated positionally from one another by an angle of 180°. The respective long horizontal axes of symmetry 13A for concave depression 13 and 14A for concave depression 14 seen in FIG. 8 are collinear, one and the same. The configurational essences of bottom side 1B of plate 1 is further appreciated with resort to FIGS. 8 and 9. FIGS. 13, 14 and 15 are respectively top, frontal and lateral views of beveled blade 9 which is identical to beveled blades 10 and 11 in composition and shape.

Figure 5:
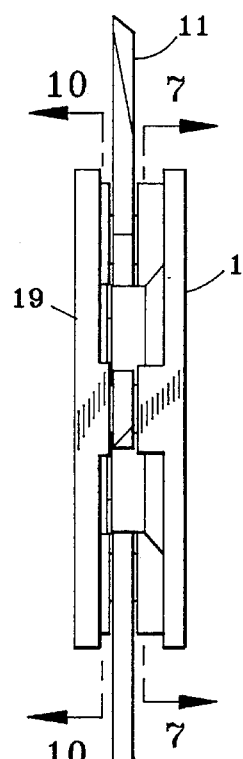
FIG. 5 is end view of the fully assembled invention.
Figure 6:
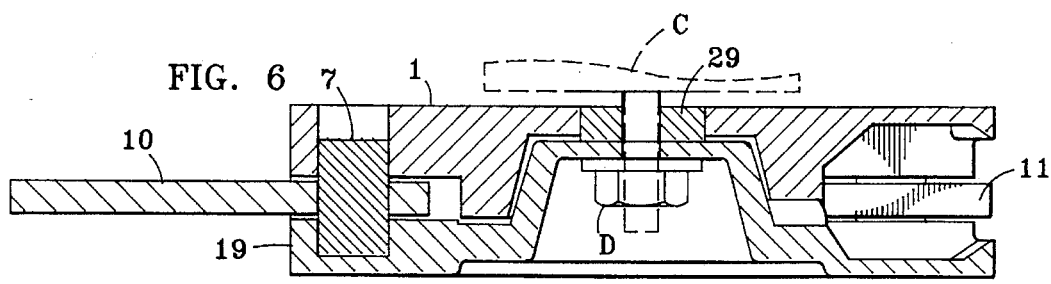
FIG. 6 is an end cross-sectional view of the fully assembled invention.
Figure 16:
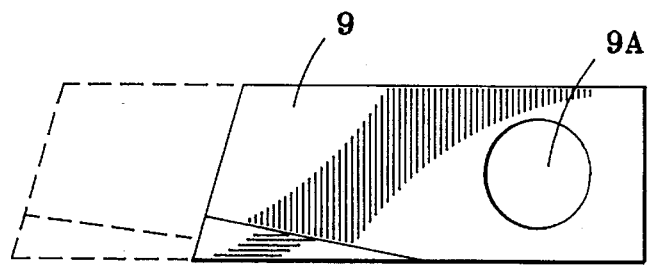
FIG. 16 is a top view of a shorter version of one of the invention's three identical blade components.

FIG. 10 is a top view of a circularly shaped bottom plate 19 also made of ALMAG 35 alloy material. Elevated circular rim 20 circumscribes its outer perimeter. Conically inclined elevation 23 is co-extensive with the flooring 19A of the top side of bottom plate 19 as seen in FIG. 10 as well as in FIG. 11. Co-extensive with conically inclined elevation 23 and positioned centrally with respect thereto is hollow cylindrical elevation 22 with reference to the flooring 19A of the top side of bottom plate 19 and centrally located within elevation 22 is centerhole 21, a through hole in plate 19. The long vertical axis of symmetry 34 seen in FIG. 11 of bottom plate 19, elevation 23, elevation 22 and centerhole 21 is everywhere one and the same. Co-extensive with an outer lateral surface of elevation 23, the flooring 19A of the top side of plate 19 and rim 20 are each of three solid rectangular abutments 24, 25 and 26, the respective vertical axes of symmetry 35, 36 and 37 of each of which is separated from the vertical axes of symmetry of the abutments adjacent thereto by angles of 120°. Closed holes 24A, 25A and 26A within the outer portions of abutments 24, 25 and 26 serve to receive the bottom of pins 6, 7 and 8 when the invention is fully assembled plate to plate as can be seen with reference to FIG. 10, FIG. 5 and FIG. 6. Positioned adjacent to the left corner of abutment 24 is convex ridge 27 co-extensive with the top surface of elevation 23 and the lateral external wall of elevation 22 as can also be noted with resort to FIG. 10 and FIG. 12. Positioned adjacent to the right corner of abutment 25 is convex ridge 28 co-extensive with the top surface of elevation 23 and the lateral external wall of elevation 22 as can be noted with resort to FIG. 10. The respective long horizontal axes of symmetry 27A for convex ridge 27 and 28A for convex ridge 28 seen in FIG. 10 are collinear, one and the same. When plates 1 and 19 are assembled together, along with pins 6, 7 and 8 and blades 9, 10 and 11; pins 6, 7 and 8 fit into holes 24A, 25A and 26A respectively and ridges 27 and 28 positionally separated by an angle of 180° fit respectively into depressions 13 and 14 while elevation 22 fits into well 12. The invention when so fully assembled is then amenable to being readily fitted to a head C via resort to adapter means 29. When assembled, the beveled edges of blades 9, 10 and 11 face in the direction of rotation as determined by the manner in which head C, when energized by motor E, rotates. The counterclockwise directed arrow etched onto the top side of hollow elevation 22 seen in FIG. 10 and the clockwise directed arrow etched onto the flooring of well 12 seen in FIG. 7 facilitate ease of assembly of the invention. If an assembler while assembling the invention, takes pains to ensure that the beveled edges of blades 9, 10 and 11 affixed to pins 6, 7 and 8 are pointed in the direction of whichever of the above-described two arrows is pointed at the point farthest from his or her eyes at the onset of assembly in contemplation of affixation to a counterclockwise rotating head C, that assembler will always be assured of proper blade direction upon commencement of cutting regardless of whether top plate 1 or bottom plate 19 were closer to his or her eyes at the onset of assembly just prior to installation of the invention onto head C. With respect to rotatory head C that rotates clockwise during operation, an assembler would be assured of proper blade fixation by having the beveled edges of blades 9, 10 and 11 pointed in the direction opposite that of the direction of the arrow farthest his or her eyes at the onset of assembly. As can be noted with respect to the foregoing recitations, rotation of head C causes the invention held intact thereto via adapter 29 and nut D to rotate as well with the result being that blades 9, 10 and 11 extend outwardly via centrifugal force to thus cut every effectively. Once again, as earlier noted, if a blade impacts a rock, by virtue of the manner in which it is swivably held via a hole in an end opposite the one where its beveled edge is located, to a pin, the blade simply collapses inward rather than shattering against rock and/or otherwise causing the shock of any such impact to be felt by a user A. FIG. 16 depicts a shorter version of a blade 9, 10 or 11 than is seen in FIG. 13. A shorter blade is inherently more efficient than a longer one as respects the matter of cutting small tree stumps flush to ground level, since, a shorter blade produces less shock to the plates from the impact of cutting than a longer blade. On the other hand, a longer blade is inherently more efficient than a shorter one for purposes of cutting shrub and grass, where accordingly impact shock is of no significant consideration, since, a greater cutting radius is covered per unit time and rotatory cutting proceeds faster with a longer blade than a shorter one.

In conclusion, respectfully submitted, the invention in view of its above-described features is not only new, useful and unique but indeed is veritably revolutionary in the art of such brush and stump cutting tools.

What is claimed is:

1. A grass and tree stump cutter tool, comprising:
   a. a circular shaped top plate with depth and made of an aluminum and magnesium alloy material;
   b. a circular shaped bottom plate with depth and made of an aluminum and magnesium alloy material;
   c. a top side of said top plate being flat;
   d. a centrally located through hole in said top plate;
   e. a circumference of a bottom side of said top plate being wholly circumscribed by a circular rim with height, a surface of said circular rim being everywhere adjacent a surface of said bottom side of said top plate;
   f. a solid conically shaped recession in said bottom side of said top plate, with a long vertical axis of symmetry of said conically shaped recession being collinear with a long vertical axis of symmetry of said centrally located through hole and a long vertical axis of symmetry of said top plate, said solid conically shaped recession further having a recession surface which is everywhere adjoined at an outermost perimeter of said recession surface with said surface of said bottom side of said top plate;
   g. a solid cylindrically shaped well in said bottom side of said top plate located below said recession with a lateral exterior surface of said well being everywhere adjoined at an uppermost brim of said lateral exterior surface of said well with a lowest brim of said surface of said recession and with flooring of said well being characterized by said centrally located through hole in said flooring with a long vertical axis of symmetry of said well being collinear with said long vertical axis of symmetry of said centrally located through hole;
   h. three identical solid rectangularly shaped abutments that are all surfacewise co-extensive with and adjoined with said surface of said bottom side of said top plate, said surface of said circular rim, said surface of said recession and said lateral exterior surface of said well;
   i. three long vertical abutment axes of symmetry, one for each one of said abutments, with each one of said long vertical axes of symmetry being located 120° apart from each other;
   j. a first concave depression in a top side of said well located adjacent a corner of one of said abutments;
   k. a second concave depression in said top side of said well located adjacent a corner of another one of said abutments such that a long horizontal axis of symmetry of said first depression is collinear with a long horizontal axis of symmetry of said second depression;
   l. three diameterwise identical abutment through holes in said top plate, one each in each one of said abutments all of which said abutment through holes are equidistant from a lateral surface of said circular shaped top plate;
   m. three identical cylindrically shaped solid metallic pins, each diameter of each of said pins being equal and less than each diameter of each of said abutment through holes;
   n. three identical, rectangularly shaped blades, one lateral edge of each of which is beveled beginning at an inclined first end of each of said blades;
   o. three diameterwise identical blade through holes, one each in each one of said blades located each equidistant from each non-inclined second end of each said blade with each diameter of each of said blade through holes being larger than said each diameter of each of said pins;
   p. a top side of said bottom plate being wholly circumscribed by a bottom plate circular rim with height, and adjoined to and everywhere co-extensive with an exterior brim of a flooring surface of said top side of said bottom plate;
   q. a solid conically shaped elevation in said top side of said bottom plate, the long vertical axis of symmetry of which said conically shaped elevation in said top side of said bottom plate being collinear with a long vertical axis of symmetry of said bottom plate;
   r. a hollow cylindrically shaped elevation extending upward from a top flat surface of said solid conically shaped elevation in said top side of said bottom plate, the diameter of which said cylindrically shaped elevation is less than the width of said conically shaped elevation in said top side of said bottom plate;
   s. a centrally located bottom plate through hole in a top side of said cylindrically shaped elevation, a long vertical axis of symmetry of which said bottom plate through hole is collinear with said long vertical axis of symmetry of said bottom plate;
   t. three identical solid rectangularly shaped bottom plate abutments that are all surfacewise co-extensive with and adjoined with said flooring surface of said top side of said bottom plate, said bottom plate circular rim and with an outer surface of said solid conically shaped elevation in said top side of said bottom plate;
   u. a long vertical axis of symmetry for each one of said bottom plate abutments being 120° removed from the long vertical axes of symmetry of the two adjacent ones of said abutments;
   v. a first convex ridge in a top side of said solid conically shaped elevation in said top side of said bottom plate that is surfacewise also co-extensive with and adjoined with an outer surface of said, cylindrically shaped elevation and that is located immediately adjacent a corner of a first one of said bottom plate abutments;
   w. a second convex ridge in said top side of said solid conically shaped elevation in said top side of said bottom plate that is surfacewise also co-extensive with and adjoined with said outer surface of said cylindrically shaped elevation and that is located immediately adjacent a corner of a second one of said bottom plate abutments such that the long horizontal axis of symmetry of said first convex ridge and a long horizontal axis of symmetry of said second convex ridge are one and the same;
   x. three diameterwise identical closed holes, one each in each one of said bottom plate abutments, all of which said closed holes are equidistant from said bottom plate circular rim;
   y. the diameters of each of said closed holes being larger than said each diameter of said each of said pins;
   z. a bottom side of said bottom plate being flat but circumferentially indented then flat again about a base perimeter of said conically shaped elevation, and;
   aa. said long vertical axis of symmetry of said centrally located bottom plate through hole being co-extensive with said long vertical axis of symmetry of said centrally located top plate through hole when said pins once press fitted one each to each one of said abutment through holes in said top plate are inserted one each into each one of said closed holes in said bottom plate after placement of each said pin through each said blade through hole, one said blade hole per said pin with the rotatable head of a motorized brush cutting unit extending through said centrally located top plate through hole and extending out through said centrally located bottom plate through hole.

2. A grass and tree stump cutter tool, comprising:

a. a circular shaped top plate with depth and made of aluminum and magnesium alloy material;

b. a circular shaped bottom plate with depth and made of aluminum and magnesium alloy material;

c. a top side of said top plate being flat;

d. a centrally located through hole in said top plate;

e. a circumference of a bottom side of said top plate being wholly circumscribed by a circular rim with height, a surface of said circular rim being everywhere adjacent a surface of said bottom side of said top plate;

f. a solid conically shaped recession in said bottom side of said top plate, with a long vertical axis of symmetry of said conically shaped recession being collinear with a long vertical axis of symmetry of said centrally located through hole and a long vertical axis of symmetry of said top plate, said solid conically shaped recession further having a recession surface which is everywhere adjoined at an outermost perimeter of said recession surface with said surface of said bottom side of said top plate;

g. a solid cylindrically shaped well in said bottom side of said top plate located below said recession with a lateral exterior surface of said well being everywhere adjoined at an uppermost brim of said lateral exterior surface of said well with a lowest brim of said surface of said recession and with flooring of said well being characterized by said centrally located through hole in said flooring with a long vertical axis of symmetry of said well being collinear with said long vertical axis of symmetry of said centrally located through hole;

h. three identical solid rectangularly shaped abutments that are all surfacewise co-extensive with and adjoined with said surface of said bottom side of said top plate, said surface of said circular rim, said surface of said recession and said lateral exterior surface of said well;

i. three long vertical abutment axes of symmetry, one for each one of said abutments, with each one of said long vertical axes of symmetry being located 120° apart from each other;

j. a first concave depression in a top side of said well located adjacent a corner of one of said abutments;

k. a second concave depression in said top side of said well located adjacent a corner of another one of said abutments such that a long horizontal axis of symmetry of said first depression is collinear with a long horizontal axis of symmetry of said second depression;

l. three diameterwise identical abutment through holes in said top plate, one each in each one of said abutments all of which said abutment through holes are equidistant from a lateral surface of said circular shaped top plate;

m. three identical cylindrically shaped solid metallic pins, each diameter of each of said pins being equal and less than each diameter of each of said abutment through holes;

n. three identical, rectangularly shaped blades, one lateral edge of each of which is beveled beginning at an inclined first end of each of said blades;

o. three diameterwise identical blade through holes, one each in each one of said blades located each equidistant from each non-inclined second end of each said blade with each diameter of each of said blade through holes being larger than said each diameter of each of said pins;

p. a top side of said bottom plate being wholly circumscribed by a bottom plate circular rim with height, and adjoined to and everywhere co-extensive with an exterior brim of a flooring surface of said top side of said bottom plate;

q. a solid conically shaped elevation in said top side of said bottom plate, the long vertical axis of symmetry of which said conically shaped elevation in said top side of said bottom plate being collinear with a long vertical axis of symmetry of said bottom plate;

r. a hollow cylindrically shaped elevation extending upward from a top flat surface of said solid conically shaped elevation in said top side of said bottom plate, the diameter of which said cylindrically shaped elevation is less than the width of said conically shaped elevation in said top side of said bottom plate;

s. a centrally located bottom plate through hole in a top side of said cylindrically shaped elevation, a long vertical axis of symmetry of which said centrally located bottom plate through hole is collinear with said long vertical axis of symmetry of said bottom plate;

t. three identical solid rectangularly shaped bottom plate abutments that are all surfacewise co-extensive with and adjoined with said flooring surface of said top side of said bottom plate, said bottom plate circular rim and with an outer surface of said solid conically shaped elevation in said top side of said bottom plate;

u. a long vertical axis of symmetry for each one of said bottom plate abutments being 120° removed from the long vertical axes of symmetry of the two adjacent ones of said abutments;

v. a first convex ridge in said top side of said solid conically shaped elevation in said top side of said bottom plate that is surfacewise also co-extensive with and adjoined with an outer surface of said cylindrically shaped elevation and that is located immediately adjacent a corner of a first one of said bottom plate abutments;

w. a second convex ridge in said top side of said solid conically shaped elevation in said top side of said bottom plate that is surfacewise also co-extensive with and adjoined with said outer surface of said cylindrically shaped elevation and that is located immediately adjacent a corner of a second one of said bottom plate abutments such that the long horizontal axis of symmetry of said first convex ridge and a long horizontal axis of symmetry of said second convex ridge are one and the same;

x. three diameterwise identical closed holes, one each in each one of said bottom plate abutments, all of which said closed holes are equidistant from said bottom plate circular rim;

y. the diameters of each of said closed holes being larger than said each diameter of said each of said pins;

z. a bottom side of said bottom plate being flat but circumferentially indented then flat again about a base perimeter of said conically shaped elevation;

aa. said long vertical axis of symmetry of said centrally located bottom plate through hole being co-extensive with said long vertical axis of symmetry of said centrally located top plate through hole when said pins once press fitted one each to each one of said abutment through holes in said top plate are inserted one each into each one of said closed holes in said bottom plate after placement of each said pin through each said blade through hole, one said blade hole per said pin with a rotatable head of a motorized brush cutting unit extending through said centrally located top plate through hole and extending out through said centrally located bottom plate through hole, and;

bb. securing means about a portion of said rotatable head of said motorized brush cutting extruding out through said centrally located bottom plate through hole for holding said grass and tree stump cutter fully assembled intact to said rotatable head.

3. A grass and tree stump cutter tool, comprising:

a. a circular shaped top plate with depth and made of an aluminum and magnesium alloy material;

b. a circular shaped bottom plate with depth and made of an aluminum and magnesium alloy material;

c. a top side of said top plate being flat;

d. a centrally located through hole in said top plate;

e. a circumference of a bottom side of said top plate being wholly circumscribed by a circular rim with height, a surface of said circular rim being everywhere adjacent a surface of said bottom side of said top plate;

f. a solid conically shaped recession in said bottom side of said top plate, with a long vertical axis of symmetry of said conically shaped recession being collinear with a long vertical axis of symmetry of said centrally located through hole and a long vertical axis of symmetry of said top plate, said solid conically shaped recession further having a recession surface which is everywhere adjoined at an outermost perimeter of said recession surface with said surface of said bottom side of said top plate;

g. a solid cylindrically shaped well in said bottom side of said top plate located below said recession with a lateral exterior surface of said well being everywhere adjoined at an uppermost brim of said lateral exterior surface of said well with a lowest brim of said surface of said recession and with flooring of said well being characterized by said centrally located through hole in said flooring with a long vertical axis of symmetry of said well being collinear with said long vertical axis of symmetry of said centrally located through hole;

h. three identical solid rectangularly shaped abutments that are all surfacewise co-extensive with and adjoined with said surface of said bottom side of said top plate, said surface of said circular rim, said surface of said recession and said lateral exterior surface of said well;

i. three long vertical abutment axes of symmetry, one for each one of said abutments, with each one of said long vertical axes of symmetry being located 120° apart from each other;

j. a first concave depression in a top side of said well located adjacent a corner of one of said abutments;

k. a second concave depression in a top side of said well located adjacent a corner of another one of said abutments such that a long horizontal axis of symmetry of said first depression is collinear with a long horizontal axis of symmetry of said second depression;

l. three diameterwise identical abutment through holes in said top plate, one each in each one of said abutments all of which said abutment through holes are equidistant from a lateral surface of said circular shaped top plate;

m. three identical cylindrically shaped solid metallic pins, each diameter of each of said pins being equal and less than each diameter of each of said abutment through holes;

n. three identical, rectangularly shaped blades, one lateral edge of each of which beginning at an inclined first each of each of said blades;

o. three diameterwise identical blade through holes, one each in each one of said blades located each equidistant from each non-inclined second end of each said blade with each diameter of each of said blade through holes being larger than said each diameter of each of said pins;

p. a top side of said bottom plate being whole circumscribed by a bottom plate circular rim with height, and adjoined to and everywhere co-extensive with an exterior brim of a flooring surface of said top side of said bottom plate;

q. a solid conically shaped elevation in said top side of said bottom plate, the long vertical axis of symmetry of which said conically shaped elevation in said top side of said bottom plate being collinear with a long vertical axis of symmetry of said bottom plate;

r. a hollow cylindrically shaped elevation extending upward from a top flat surface of said solid conically shaped elevation in said top side of said bottom plate, the diameter of which said cylindrically shaped elevation is less than the width of said conically shaped elevation in said top side of said bottom plate;

s. a centrally located bottom plate through hole in a top side of said cylindrically shaped elevation, a long vertical axis of symmetry of which said centrally located bottom plate through hole is collinear with said long vertical axis of symmetry of said bottom plate;

t. three identical solid rectangularly shaped bottom plate abutments that are all surfacewise co-extensive with and adjoined with said flooring surface of said top side of said bottom plate, said bottom plate circular rim and with an outer surface of said solid conically shaped elevation in said top side of said bottom plate;

u. a long vertical axis of symmetry for each one of said bottom plate abutments being 120° removed from the long vertical axes of symmetry of the two adjacent ones of said abutments;

v. a first convex ridge in a top side of said solid conically shaped elevation in said top side of said bottom plate that is surfacewise also co-extensive with and adjoined with an outer surface of said cylindrically shaped elevation and that is located adjacent a corner of a first one of said bottom plate abutments;

w. a second convex ridge in said top side of said solid conically shaped elevation in said top side of said bottom plate that is surfacewise also co-extensive and adjoined with said outer surface of said cylindrically shaped elevation and that is located immediately adjacent a corner of a second one of said bottom plate abutments such that the long horizontal axis of symmetry of said first convex ridge and a long horizontal axis of symmetry of said second convex ridge are one and the same;

x. three diameterwise identical closed holes, one each in each one of said bottom plate abutments, all of which said closed holes are equidistant from said bottom plate circular rim;

y. the diameters of each of said closed holes being larger than said each diameter of said each of said pins;

z. a bottom side of said bottom plate being flat but circumferentially indented then flat again about a base perimeter of said conically shaped elevation, and;

aa. said long vertical axis of symmetry of said centrally located bottom plate through hole being co-extensive with said long vertical axis of symmetry of said centrally located top plate through hole when said pins once press fitted one each to each one of said abutment through holes in said top plate are inserted one each in to each one of said closed holes in said bottom plate after placement of each said pin through each said blade through hole, one said blade hole per said pin with a rotatable head of a motorized brush cutting unit extending through said centrally located top plate through hole and extending out through said centrally located bottom plate through hole, and;

bb. cylindrical adapter means with an outer circumference less than a circumference of said centrally located through hole in said top plate, which said cylindrical adapter, having an adapter center hole is fitted to said centrally located through hole in said top plate for holding said grass and tree stump cutter fully assembled intact to said rotatable head.

4. A grass and tree stump cutter tool, comprising:

a. a circular shaped top plate with depth and made of an aluminum and magnesium alloy material;

b. a circular shaped bottom plate with depth and made of an aluminum and magnesium alloy material;

c. a top side of said top plate being flat;

d. a centrally located through hole in said top plate;

e. a circumference of a bottom side of said top plate being wholly circumscribed by a circular rim with height, a surface of said circular rim being everywhere adjacent a surface of said bottom side of said top plate;

f. a solid conically shaped recession in said bottom side of said top plate, with a long vertical axis of symmetry of said conically shaped recession being collinear with a long vertical axis of symmetry of said centrally located through hole and a long vertical axis of symmetry of said to plate, said solid conically shaped recession further having a recession surface which is everywhere adjoined at an outermost perimeter of said recession surface with said surface of said bottom side of said top plate;

g. a solid cylindrically shaped well in said bottom side of said top plate located below said recession with a lateral exterior surface of said well being everywhere adjoined at an uppermost brim of said lateral exterior surface of said well with a lowest brim of said surface of said recession and with flooring of said well being characterized by aid centrally located through hole in said flooring with a long vertical axis of symmetry of said well being collinear with said long vertical axis of symmetry of said centrally located through hole;

h. three identical solid rectangularly shaped abutments that are all surfacewise co-extensive with and adjoined with said surface of said bottom side of said top plate, said surface of said circular rim, said surface of said recession and the said lateral exterior surface of said well;

i. three long vertical axis of symmetry, one for each one of said abutments, with each one of said long vertical axes of symmetry being located 120° apart from each other;

j. a first concave depression in a top side of said well located adjacent a corner of one of said abutments;

k. a second concave depression in said top side of said well located adjacent a corner of another one of said abutments such that a long horizontal axis of symmetry of said first depression is collinear with a long horizontal axis of symmetry of said second depression;

l. three diameterwise identical abutment through holes in said top plate, one each in each one of said abutments all of which said abutment through holes are equidistant from a lateral surface of said circular shaped top plate;

m. three identical cylindrically shaped solid metallic pins, each diameter of each of said being equal and less than each diameter of each of said abutment through holes;

n. three identical, rectangularly shaped blades, one lateral edge of each of which is beveled beginning at an inclined first end of each of said holes;

o. three diameterwise identical blade through holes, one each in each one of said blades located each equidistant from each non-inclined second end of each said blade with each diameter of each of said blade through holes being larger than said each diameter of each of said pins;

p. a top side of said bottom plate being wholly circumscribed by a bottom plate circular rim with height, and adjoined to and everywhere co-extensive with an exterior brim of a flooring surface of said top side of said bottom plate;

q. a solid conically shaped elevation in said top side of said bottom plate, the long vertical axis of symmetry of which said conically shaped elevation in said top side of said bottom plate being collinear with a long vertical axis of symmetry of said bottom plate;

r. a hollow cylindrically shaped elevation extending upward from a top flat surface of said solid conically shaped elevation in said top side of said bottom plate, the diameter of which said cylindrically shaped elevation is less than the width of said conically shaped elevation in said top side of said bottom plate;

s. a centrally located bottom plate through hole in a to p side of said cylindrically shaped elevation, a long vertical axis of symmetry of which said centrally located bottom plate through hole is collinear with said long vertical axis of symmetry of said bottom plate;

t. three identical solid rectangularly shaped bottom plate abutments that are all surfacewise co-extensive with and adjoined with said flooring surface of said top side of said bottom plate, said bottom plate circular rim and with an outer surface of said solid conically shaped elevation in said top side of said bottom plate;

u. a long vertical axis of symmetry for each one of said bottom plate abutments being 120° removed from the long vertical axes of symmetry of the two adjacent ones of said abutments;

v. a first convex ridge in a top side of said solid conically shaped elevation in said top side of said bottom plate that is surfacewise also co-extensive with and adjoined with an outer surface of said cylindrically shaped elevation and that is located immediately adjacent a corner of a first one of said bottom plate abutments;

w. a second convex ridge in said top side of said solid conically shaped elevation in said top side of said bottom plate that is surfacewise also co-extensive and adjoined with said outer surface of said cylindrically shaped elevation and that is located immediately adjacent a corner of a second one of said bottom plate abutments such that the long horizontal axis of symmetry of said first convex ridge and a long horizontal axis of symmetry of said convex ridge are one and the same;

x. three diameterwise identical closed holes, one each in each one of said bottom plate abutments, all of which said closed holes are equidistant from said bottom plate circular rim;

y. the diameters of each of said closed holes being larger than said each diameter of said each of said pins;

z. a bottom side of said bottom plate being flat but circumferentially indented then flat again about a base perimeter of said conically shaped elevation, and;

aa. said long vertical axis of symmetry of said centrally located bottom plate through hole being co-extensive with said long vertical axis of symmetry of said centrally located top plate through hole when said pins once press fitted one each to each one of said abutment through holes in said top plate are inserted one each into each one of said closed holes in said bottom plate after placement of each said pin through each said blade through hole, one said blade hole per said pin with a rotatable head of a motorized brush cutting unit extending through said centrally located top plate through hole and extending out through said centrally located bottom plate through hole, and;

bb. cylindrical adapter means with an outer circumference less than a circumference of said centrally located through hole in said top plate, which said cylindrical adapter, having an adapter center hole, is fitted to said centrally located through hole in said top plate for holding said grass and tree stump cutter fully assembled intact to said rotatable head;

cc. securing means about a portion of said rotatable head of said motorized brush cutting unit extruding out through said centrally located bottom plate through hole for holding said grass and tree stump cutter fully assembled intact to said rotatable.

\* \* \* \* \*